G. C. JETT.
TRACTOR.
APPLICATION FILED JAN. 30, 1913.
1,135,187.
Patented Apr. 13, 1915.
4 SHEETS—SHEET 1.
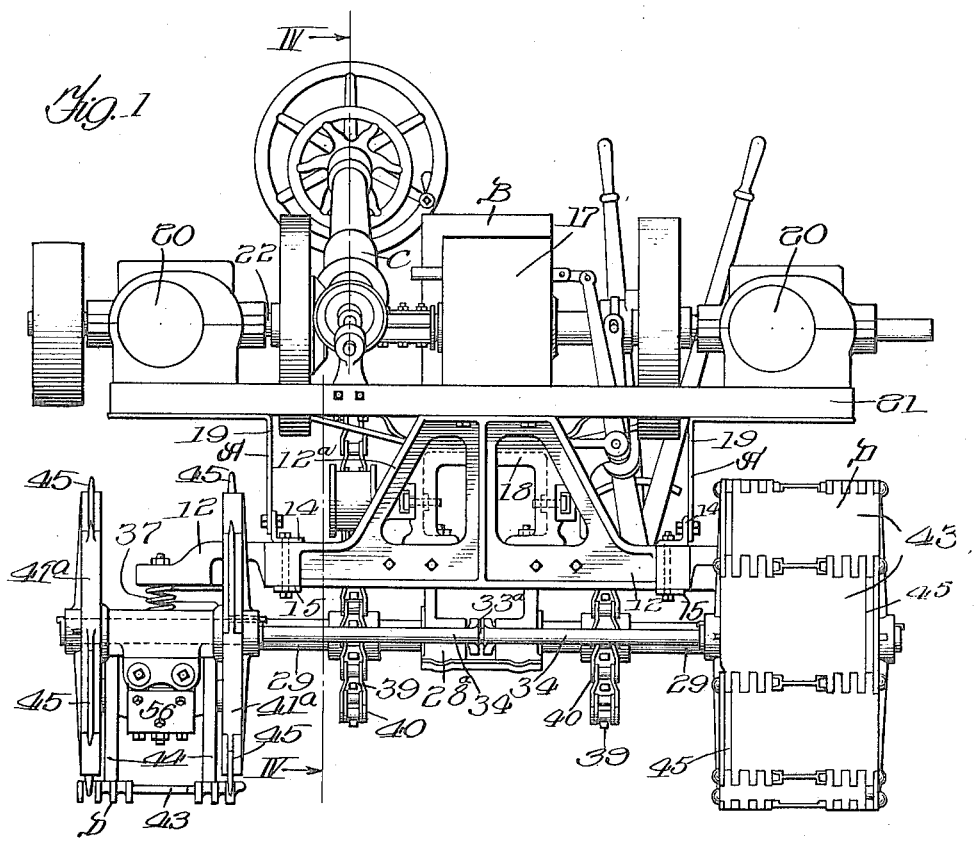
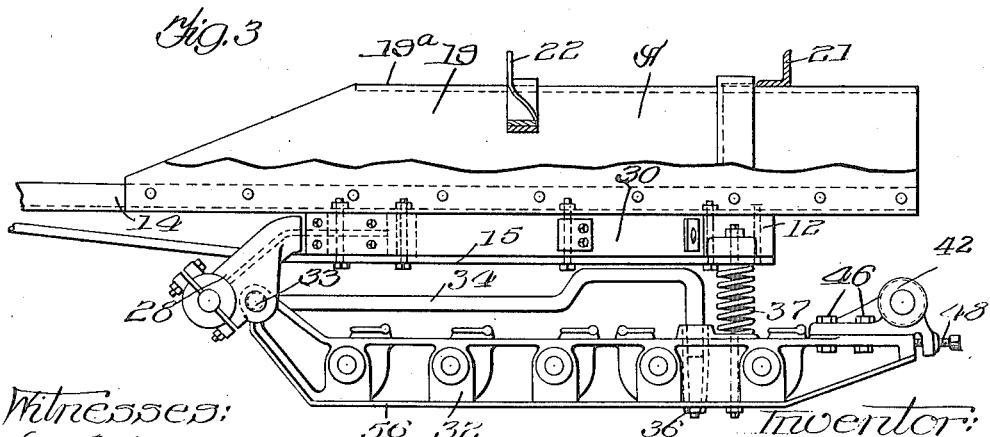

G. C. JETT.
TRACTOR.
APPLICATION FILED JAN. 30, 1913.
1,135,187.
Patented Apr. 13, 1915.
4 SHEETS—SHEET 2.
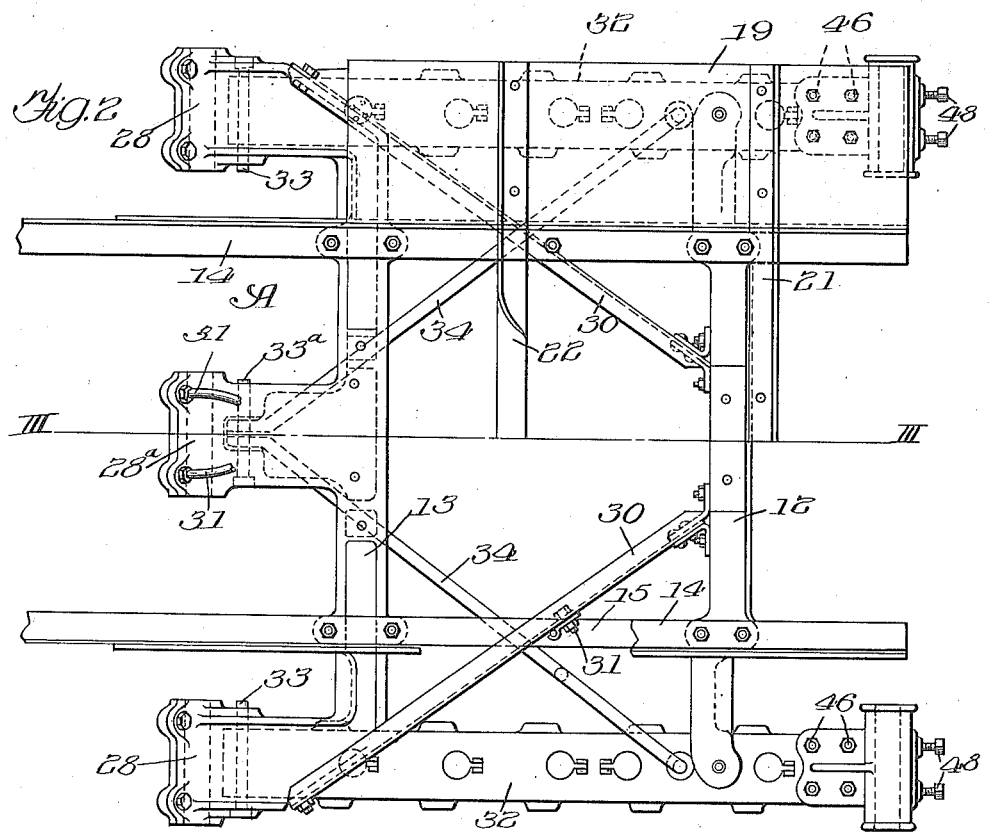
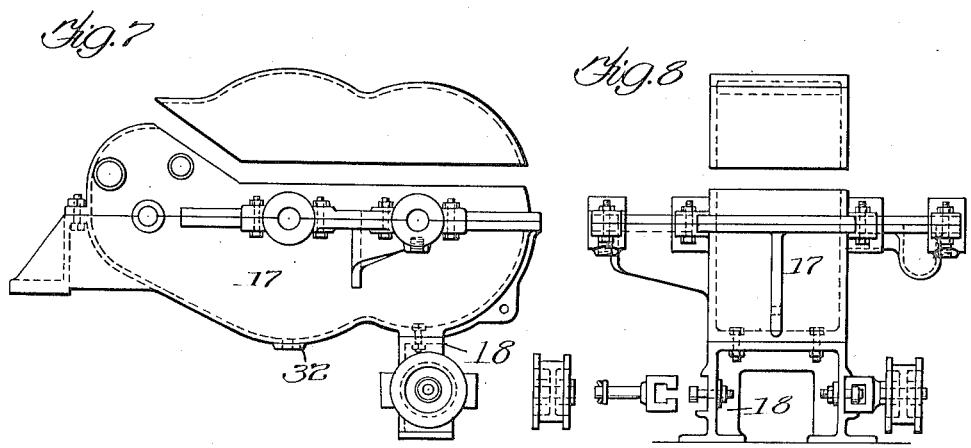
Witnesses:
Inventor:
George C. Jett

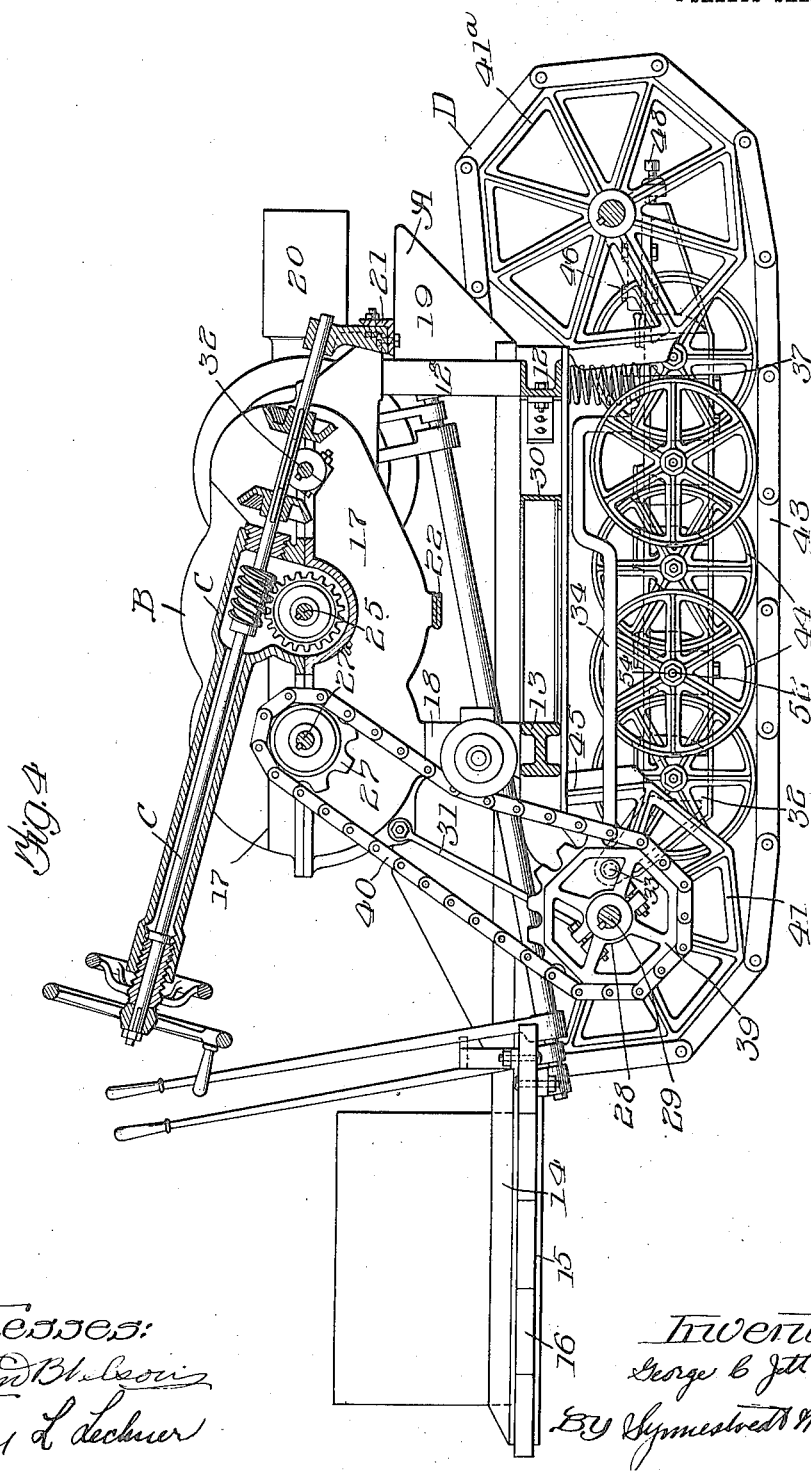

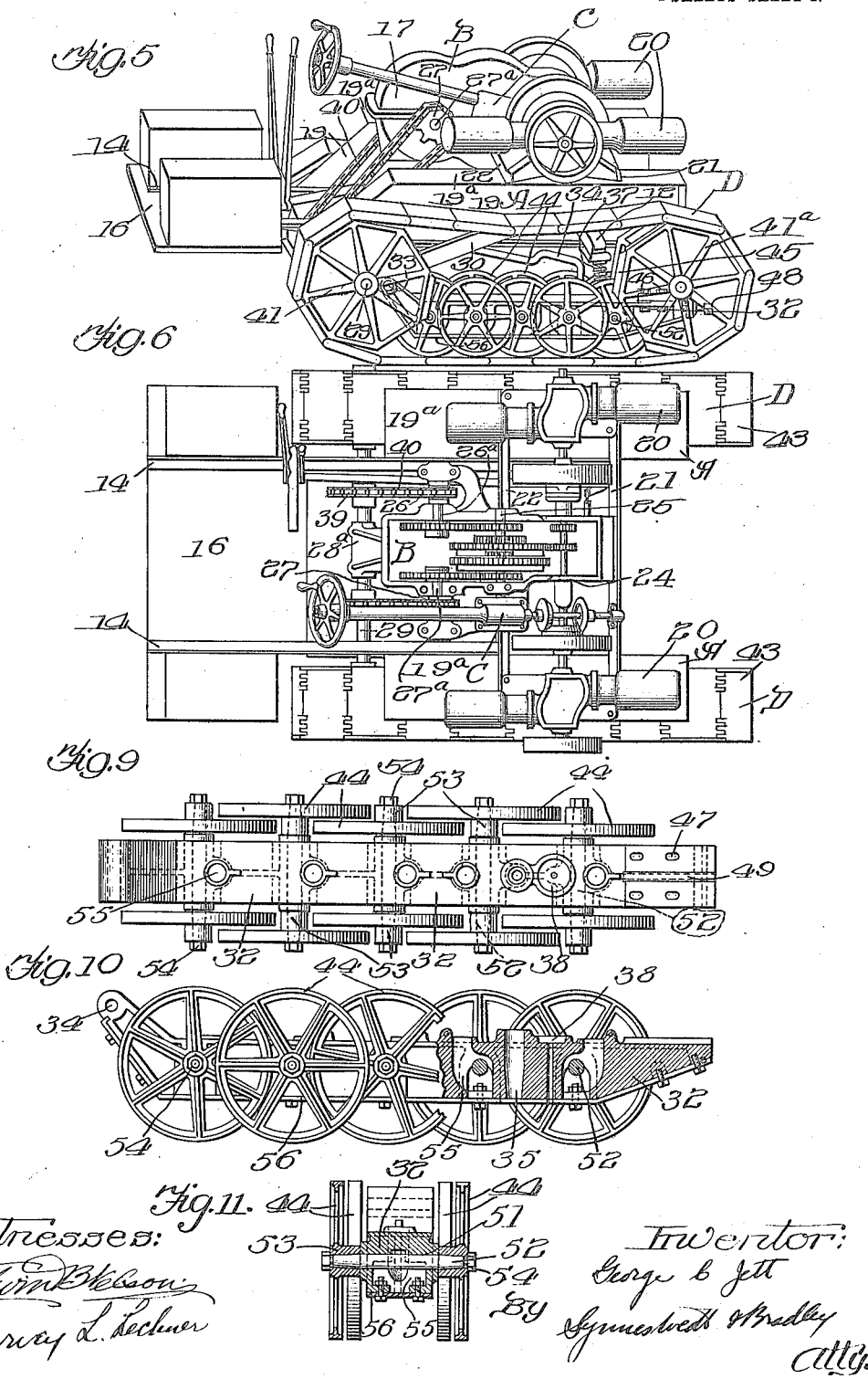

UNITED STATES PATENT OFFICE.

GEORGE C. JETT, OF GARY, INDIANA.

TRACTOR.

1,135,187. Specification of Letters Patent. Patented Apr. 13, 1915.

Original application filed March 2, 1912, Serial No. 681,237. Divided and this application filed January 30, 1913. Serial No. 745,107.

*To all whom it may concern:*

Be it known that I, GEORGE C. JETT, a citizen of the United States, residing at Gary, in the county of Lake and State of Indiana, have invented certain new and useful Improvements in Tractors, of which the following is a specification, reference being had to the accompanying drawings.

My invention relates generally to improvements in vehicles, and more particularly to their application to the class of traction engines.

My invention has for one of its objects the provision of an improved tractor particularly adapted for service in soft and miry ground which is simple in construction and operation, and in the arrangement of its parts; another object is the provision in a tractor of novel means to obtain a broad endless chain tread upon which the entire weight of the tractor is carried and the weight evenly distributed over a large area of ground by means of the broad planes thus obtained; another object of my invention is to provide an improved interlocking arrangement of the bearing wheels within the chain tread members permitting the close association of a large number of bearing or contact points with the planes of the chain tread member, thereby preventing buckling of chain planes, and also permitting a reduction in the size of the planes between their bending points to obtain a corresponding increase in the number of sprocket chords; together with novel means designed to obtain constant rather than variable rotation of the chain tread.

A further object of my invention is the provision of means adapted to properly adjust the tension of the chain tread. A still further object of my invention is the provision of a tractor which delivers the highest possible efficiency of the motor power represented in the pull at the draw bar in ratio to its weight, without disturbing or packing cultivated ground.

These together with such other objects as may hereinafter appear or are incident to my invention I attain by means of a construction illustrated in preferred form in the accompanying drawings, wherein:

Figure 1 is a front elevation of the tractor embodying my invention, with the chain tread removed from one side of the machine.

Figure 2 is a plan view of the frame members.

Figure 3 shows a side elevation of Figure 2 with all the members above the broken line sectioned on dotted line III—III of Figure 11.

Figure 4 is a vertical section drawn on the line IV—IV of Figure 1.

Figure 5 is a perspective view of the tractor as to appearance when assembled.

Figure 6 is a plan view of the complete structure.

Figures 7 and 8 are side and rear elevations respectively of the gear casing, portions of the chain tightener being disassociated in Figure 8 to illustrate their relation with the gear casing.

Figures 9, 10 and 11 represent plan, longitudinal sectional and transverse sectional views of the side girders respectively.

In disclosing my invention I provide a main frame A comprising front and rear transverse girders 12 and 13 respectively which are bolted to the under sides of longitudinal angle members 14, and to the upper sides of longitudinal bars 15, both of these longitudinal members being extended rearwardly to form cantaliver beams which support the operator's platform 16 as shown in Figures 5 and 6.

The numeral 17 indicates a gear case rigidly secured to and supported centrally above the frame A by the channel member 18 fast on the rear girder 13, and by the upwardly extending front girder truss 12$^a$ in supporting engagement therewith. Mud guards 19 are bolted to the angles 14 and positioned on both sides of the gear case 17, and are further bent outwardly to provide horizontal plane surfaces 19$^a$ the preferred location for a suitable source of power, as the motors 20. In supporting engagement with the gear case 17 are angle irons 21 and 22 fastened at their proximate ends to the guards 19; a portion of the vertical leg of the member being folded down on its horizontal leg where this member is bent under to partly sustain the gear case.

24 represents a drive shaft journaled in the gear case 17 transmitting power from the motor 20 to the transmission mechanism B which is associated with a differential mechanism in the gear case, which differential is actuated by a gear shaft 25 which receives rotation from the steering mechanism C through a worm and worm wheel as clearly shown in Figure 4. The differential gearing is in operative relation with the drive sprockets 26 and 27 which are mounted on shafts 26ᵃ and 27ᵃ respectively and have bearings in the gear case 17, the latter being, as previously stated, rigidly supported centrally of and above the plane of the frame A.

The rear girder 13 is provided at its proximate ends with rearwardly and downwardly projecting journal boxes 28 formed integrally therewith, and is further provided with a similar journal box 28ᵃ centrally positioned intermediate the boxes 28 all affording alined bearings for a divided axle 29. The outer journal boxes are effectually braced by the channels 30, which are bolted to their outer vertical faces and run diagonally forward and are rigidly secured to the forward girder as shown in Figure 2. The journal box 28ᵃ is braced by the brace rod 31 which extend upwardly and are bolted to the rigid gear case 17. To give further rigidity to the channels 30, and to other chord members of the frame, the channels are securely bolted to the longitudinal bars 14 and 15.

On opposite sides of the frame A and running forward parallel with each other are side girders 32, pivotally mounted on the outer journal boxes, each girder having an upwardly inclined rear portion provided with an eye adapted to receive the pivot pin 33 positioned in the journal box.

The central journal box 28ᵃ similarly provides a bearing for a pivot pin 33ᵃ in alinement with the pins 33, which pin 33ᵃ forms the pivot for the rods 34 which extend divergently forward to a point where the depending tapered ends are received in holes 35 cored in the side girders 32 and secured by the nuts 36. If desired the hole which receives the tapered end of the brace rod may be cored large enough so that intervening space may then be filled in with Babbitt or other suitable low fusing metals, thus affording easy and exact alinement of these parts. The taper end of the rods and the nut permit ready removal.

Between the main frame A and the side girders 32 are weight carrying springs 37, each bolted at its upper end to one of the outer extremities of front girder 12, the lower end of the spring being bolted to the girder and firmly positioned in a seat 38 formed in the upper surface of the girder.

Keyed to the divided axle at points intermediate the inner and outer journal boxes are driven sprockets 39 connected to the drive sprockets 26 and 27 by endless drive chains 40, and similarly mounted on the axle are chain tread sprocket wheels 41 positioned on both sides of each outer journal box 28. The sprockets 39 and 41 have their peripheries made up of a series of chords, and I preferably provide them with an equal number of chords, or approximate chords, and locate the chords with respect to each other so that the sprockets may be on their longest, or shortest, radii at the same instant.

At the forward end of the side girders 32 are journal boxes 42 having bearings for idler chain tread sprocket wheels 41ᵃ, which together with the sprocket wheels 41 carry an endless chain tread D, and which latter includes the broad level planes 43 pivotally connected together to serve as a track for the weight carrying or bearing wheels 44 journaled in the side girders 32, as more fully described hereinafter.

In a co-pending application for Letters Patent, bearing the Serial Number 681,237, and filed March 2nd, 1912, I show my preferred arrangement of transmission gearing in which I obtain varying forward and reverse speeds, and this gearing is connected to a differential mechanism actuated by a steering shaft (as c in Figure 4) to obtain opposing movement of the chain tread members on either side of the machine to turn the tractor in its own length, or with the transmission cut in to turn the tractor in either direction on any desired arc.

From the description thus far made it will be apparent that inasmuch as the girders are pivotally mounted on the frame at their rear ends, the chain treads have vertical movement within the limit of elasticity of the weight carrying tension and compression springs 37, the three pins 33, 33, 33ᵃ forming the axis of this permitted vertical movement which is provided to take care of inequalities in roads or elsewhere as they are met with.

Referring now again to the driven sprockets 39 and sprocket wheels 41, I have said that their respective peripheral chords are equal in number and similarly located, and my purpose is to overcome the objectionable feature of a variable speed due to variable radial distance of the chain to the axis of rotation of the driving sprocket. As the angle between the drive chain and chain tread is fixed, I obtain constant and continuous velocity in the chain tread, in that the drive chain members on driven sprockets 39 and tread chain members on sprocket wheels 41 are driving on their longest radii at the same instant and on the shortest radii at another instant; which stating it in other words, that sprockets 39 and 41 are so located on the shaft 29 that the drive chain and chain tread come tangent to the peripheral chords of 39 and 41 at the same instant. It is considered important and preferable that the number of sprockets in 39 be equally divisible by the number of chords thereon.

The preferred means of engagement between sprocket wheels 41, 41ª, and the chain tread members is to alternately locate the sprockets on the chords on each pair of associated sprocket wheels and to similarly provide an alternate arrangement of slots 45 in the chain tread, in other words each plane 43 has only one slot in order to eliminate as far as possible any disturbance of cultivated ground as will be understood.

The front journal boxes 42 are secured to the upper surface of its respective side girder 32 by bolts 46 passing through elongated or slotted holes 47, so that on loosening up the bolts 46 the journal box is capable of longitudinal adjustment through the set screws 48 provided to tighten or otherwise adjust the chain tread, in order to remove it or take up for wear. After adjustment, the bolts 46 are tightened, and to insure perfect longitudinal alinement for any position of the journal box on the girder, complementary ways are provided on the journal box and in the girder as shown at 49.

Referring now more particularly to Figures 9, 10 and 11, it will be seen that the side girders furnish the journal bearings for the bearing wheels 44 which have what I term an interlocking arrangement with each other, whereby I obtain a greater number of wheel bearing or contact points with the chain tread within a minimum space, and with a minimum of friction at such points due to the greater wheel circumference obtained by this arrangement.

This arrangement is further designed to prevent buckling of chain tread members usually present where the distance between bearing wheel contacts is greater than the length of chain tread planes thereby increasing the number of sprocket wheel chords in a given wheel with a view to approach as nearly as possible a circle in effect, or in other words to obtain constant rotation as opposed to a variable or flopping action of the chain tread. Decreasing the length of the planes, as herein provided for, does not subtract from the desired large bearing surface of the chain tread, for by arranging the associated pairs of sprocket wheels 41 and 41ª on either side of the journal boxes, which in this instance act as spacing members between the members of each pair, I obtain a series of successive broad planes pivoted together at their edges to form a comparatively solid and endless track for the weight carrying or bearing wheels to roll on, and thus form what might be termed a platform possessing sufficient breadth to evenly distribute the weight of the machine over an extended area, so that the tractor can readily operate over heavy ground where an ordinary traction machine would mire.

The bearings 51 provided in the web of the girders 32 are preferably taper bored to receive correspondingly tapered axles 52 of the bearing wheels 44, and are so located that the greatest diameter of the wheels can be suitably placed in the shortest distance between the axes, thereby ultimately obtaining a greater number of wheels of a larger circumference; a greater number of points of contact with the endless track within the shortest distance between outer contact points; and with a minimum of friction engendered.

To obtain this interlocking arrangement I provide the interchangeable hubs 53 which are alternately positioned on successive axles to bear against the inner sides of one pair of wheels, and against the outer sides of the adjacent pair of wheels, the wheels being secured on their axles by the nuts 54. It will be noted that axles, wheels, hubs, and nuts are similar in every respect, except in the method of their arrangement. In my preferred construction the distance between points of contact of weight carrying wheels is less than the length of a link member or plane.

The side girder web is cored to provide oil pockets 55 which extend vertically through the bearings, and are designed for the insertion of oily waste to thoroughly lubricate the bearing wheel axles. The several oil pocket openings in the under side of the girder are covered by one continuous cover plate 56 which performs the double duty of affording the bottom for the oily pockets and also acts as the bottom chord member of the girder, being secured thereto in any suitable manner.

The gear case is provided with a removable cover and is made oil tight for the purpose of filling it sufficiently with oil so as to give a complete and continuous oiling system to the transmission and differential mechanism located therein.

From the foregoing, it will be apparent that my tractor is particularly adapted for traction purposes through rough or miry country by reason of the broad planes afforded in the extended chain treads or platforms, which furnish and bridge its own road across furrows and ditches. By hinging the chain treads at the rear end of the tractor, each is free and independent of the other to find its own proper alinement on the ground. The entire arrangement is compact and of simple construction, and all members carrying the heaviest loads are arranged so as to take care of the loads in the direction of the forces along which they occur. The highest efficiency of the motor power used is obtained by making all members which come in contact with the ground a part of the driving force which is therefore delivered in drawbar pull.

Other advantages will readily appear to those skilled in the art.

Having thus described my invention and illustrated its use what I claim as new and desire to obtain by Letters Patent is the following:—

1. A traction mechanism comprising a main frame, traction wheels carried by said frame, a traction girder intermediate the wheels, an endless belt passed around said wheels composed of pivoted tread members, and means for preventing buckling of the tread members on their pivots in the travel of the belt comprising a plurality of interrelated bearing wheels mounted in the girder and so arranged therein with reference to the tread members that the wheels severally contact with adjacent underlying tread members comprised within the lower stretch of belt, the distance between contact points of adjacent wheels being slightly less than the length of a tread member.

2. A traction mechanism comprising a main frame, traction wheels carried by said frame, at least one of which has a periphery composed of a series of sprocketed chords, a traction girder intermediate said wheels, an endless traction belt passed around said wheels composed of pivoted tread members adapted to engage said chords, and means mounted in said girder for preventing buckling of the tread members on their pivots in the travel of the belt comprising a group of alternate overlapping and interfitting bearing wheels arranged in said girder with reference to said chords and tread members whereby wheels of the group severally bear upon adjacent underlying tread members comprised within the lower stretch of belt to maintain the alinement of the belt.

3. A traction mechanism comprising a main frame, traction wheels carried by said frame and comprising associated pairs of spaced driving and idler wheels, an endless belt passed around said wheels composed of broad pivoted tread members adapted to bridge the wheels of each pair in the travel of the belt and each having a breadth greater than their length, a traction girder intermediate each pair of wheels, and a plurality of bearing wheels mounted in the girder and arranged therein in a staggered inter-relation with one another to bear upon tread members in the lower stretch of belt in such a manner that the distance between the points of contact is less than the length of a tread member.

4. A traction mechanism comprising a main frame, traction wheels carried by said frame, a traction girder extending longitudinally between the wheels, an endless belt passed around said wheels and composed of pivoted tread members, and means mounted in said girder for preventing buckling of the tread members in the travel of the belt comprising a plurality of bearing wheels arranged in a staggered inter-relation with each other and with the traction wheels, said wheels severally bearing on adjacent tread members composing the lower stretch of belt with the distance between points of contact slightly less than the length of a tread member.

5. In a tractor, the combination of a frame, a driving wheel journaled in said frame, an idler wheel, a traction belt passing around said wheels, a traction girder pivotally mounted on the driving wheel with its forward end in supporting relation with the idler wheel and provided with bearing wheels adapted to bear on the lower stretch of belt, and a spring connection interposed between the girder and frame and at a point adjacent the idler wheel.

6. In a tractor, the combination of a frame, a driving wheel journaled in said frame, an idler wheel, a traction belt passing around said wheels, a traction girder pivotally mounted on the driving wheel and having its forward end in supporting relation with the idler wheel, and a bracing member for the girder having its rear end pivoted in the frame and on a line substantially coincident with the pivotal axis of the girder.

7. In a tractor, the combination of a frame having a drive axle, a pair of rear driving wheels mounted in a spaced relation on said axle, a pair of associated front idler wheels, a traction belt passing around both pairs of wheels, a traction girder supporting the idler wheels and having its rear end pivotally mounted at a point intermediate the pair of rear driving wheels, a spring connection interposed between the girder and the frame at a point removed from the pivoted end of the girder, and bearing wheels mounted in said girder to bear on the lower stretch of belt intermediate the driving and idler wheels.

8. In a tractor having a frame and a chain tread member disposed for travel along the ground, of a traction mechanism comprising a sprocket wheel and a sprocket gear mounted in the frame for synchronous rotation movement and having their sprocket chords located similarly with respect to each other, said sprocket wheel being adapted to operatively engage said chain tread member, and a drive member located in said frame with reference to the chain tread member and engaging said sprocket gear, all so arranged whereby to impart a constant velocity to the chain traction member in its said travel.

9. In a tractor, the combination with a frame and a chain traction member mounted adjacent the side of the frame for travel along the ground, of a driven axle mounted in said frame, a traction sprocket wheel on the axle operatively engaging said chain traction member and formed with a chordal periphery, and means coöperating therewith for imparting a constant velocity to said chain traction member comprising a driven sprocket gear mounted on the axle to have synchronous rotative movement with the wheel and having its sprocket chords located with reference to the chords of the traction sprocket wheel, and a driving member in operative relation with said driven sprocket gear and disposed in the frame at a fixed angle with respect to the line of normal travel of the chain traction member.

10. In a tractor, a traction mechanism comprising a frame, a differential and transmission mechanism mounted in a portion of said frame, a steering means in operative relation with said mechanism, traction devices located adjacent the sides of the frame for travel along the ground comprising a traction belt and a driving wheel adapted to engage with said belt to drive the belt, transverse shafts disposed in alinement in another portion of said frame and each carrying at its outer end one of said driving wheels, and independently operable connections between said mechanism and each shaft, substantially as described.

11. In a tractor, a traction mechanism comprising a frame, traction devices located at the sides of the frame and each comprising a traction belt and a driving wheel engaged with said belt, transverse shafts arranged end to end in line with each other in the frame and each carrying at its outer end one of said driving wheels, a transmission and differential mechanism removed from said shafts, a sprocket gear mounted adjacent the inner end of each shaft to have synchronous rotative movement with its contiguous wheel, and independent drive connections extending between the said mechanism and each sprocket and located at an angle with reference to the line of travel of said traction belt, substantially as described.

12. In a tractor, a traction mechanism comprising a frame, traction devices located adjacent the sides of the frame and each comprising a traction belt and a driving wheel adapted to engage with said belt to actuate it, transverse shafts disposed in said frame and each carrying at its outer end one of the said driving wheels, a sprocket gear mounted on each shaft to rotate with its adjacent wheel, a differential mechanism in said frame removed from said shafts, and independently operable connections extending between the said mechanism and each sprocket, substantially as described.

In testimony whereof, I have hereunto signed my name in the presence of the two subscribed witnesses.

GEORGE C. JETT.

Witnesses:
W. HERBERT FOWKES,
MARGARET MOORE.